United States Patent [19]
Louie

[11] 3,925,647

[45] Dec. 9, 1975

[54] PARITY PREDICTING AND CHECKING LOGIC FOR CARRY LOOK-AHEAD BINARY ADDER

[75] Inventor: Ming H. Louie, Norristown, Pa.

[73] Assignee: Honeywell Information Systems Inc., Waltham, Mass.

[22] Filed: Sept. 30, 1974

[21] Appl. No.: 510,674

[52] U.S. Cl. .......... 235/153 BB
[51] Int. Cl.[2] .......... G06F 11/10
[58] Field of Search .......... 235/153 BB

[56] References Cited

UNITED STATES PATENTS

| | | | |
|---|---|---|---|
| 3,078,039 | 2/1963 | Anderson | 235/153 BB |
| 3,342,983 | 9/1967 | Pitkowsky et al. | 235/153 BB |
| 3,470,366 | 9/1969 | Geller | 235/153 BB |
| 3,659,089 | 4/1972 | Payne et al. | 235/153 BB |
| 3,758,760 | 9/1973 | Cowan | 235/153 BB |

OTHER PUBLICATIONS

Howe et al., Increased Coverage for Group Look-Ahead Adders, IBM Tech. Disclosure Bulletin, Vol. 13, No. 3, Aug. 1970, pp. 781–782.

*Primary Examiner*—Charles E. Atkinson
*Attorney, Agent, or Firm*—Ronald T. Reiling; David A. Frank

[57] ABSTRACT

Logic for checking the correctness of half-sum, full-sum (or result) and look-ahead carry of a two-operand adder. Parity for half-sum or full-sum is first predicted and the predicted parity is then compared with the generated parity. The latter operation detects an error which has occurred during an arithmetic or logical operation in the adder. The digit look-ahead carry is compared with the generated digit carry for refining error isolation when an error is detected.

10 Claims, 12 Drawing Figures

PARITY PREDICTING AND CHECKING LOGIC FOR CARRY LOOK-AHEAD BINARY ADDER

BACKGROUND OF THE INVENTION

1. Field of the Invention

This invention relates generally to the area of error detection for a digital computer system and more specifically to error detection logic for a high-speed carry look-ahead binary adder.

2. Description of the Prior Art

A binary adder is generally considered to be one of the most important elements in electronic digital computer systems. The speed and reliability of the binary adder are, therefore, a major concern in computer system design. It is well known that a carry look-ahead adder generates the result of an operation on two operands faster than that of a ripple carry adder. It is also known that a carry look-ahead adder can be implemented in many different ways. This invention is not concerned with design of a high-speed binary adder, but rather relates to the design of checking logic for error detection in a carry look-ahead adder.

In the past, computers were used largely in an off-time, batch-processing mode and the consequences of undetected hardware malfunctions were relatively minor. Nowadays, digital computers are utilized in on-line information processing, data entry and retrieval, and real-time control of processes. Incorrect computer operation in any of these applications has to be detected as soon as possible. At the same time, the increased size and complexity of digital computers have made it more and more difficult to ensure correct machine operation.

Most modern computer systems, both large or small, contain certain types of built-in error detection logic for reliability purposes. One of the most commonly used methods of error detection is to have parity checking throughout the computer system. This is accomplished by associating an extra bit (known as the parity bit) with the information bits (either data bits or control bits). The parity bit is determined by the oddness or evenness of the number of ones contained in the information bits. For "odd parity," if the number of ones in the data bits is odd, the parity bit is a 0. If the number of ones in the information bits is even, the parity bit is a 1, so that the total number of ones in a group (information bits and parity bit) of bits is always odd. In an "even parity" system, the parity bits are the opposite of those above-described for odd parity. A parity checking scheme depends upon the odd or even parity relationship between a group of bits. Such a relationship will always be preserved in the absence of error.

The majority of logic in a typical digital computer system is involved in the transfer of information bits. Storing or transferring of information is accompanied by parity bits to assist in detecting errors. When information bits are transferred from one register to another, the parity bit is also carried over with these bits. Parity checking logic checks whether the number of ones in a group of bits is even or odd. The logic should be placed in critical areas throughout the computer system such that any single bit error or any failure involving an odd number of bits will be detected, and, if possible, isolated within the shortest possible time.

The operation of an adder generally involves two operand registers. The information bits in these registers are transformed as well as transferred by the binary adder and the resultant parity bits of the operands are difficult to predict. To solve this particular problem, a commonly used technique for adder error checking is to employ two identical adders in the system and to compare their results bit-by-bit to check that the operation is error free. Another technique is to have three identical adders in the system and "take a majority vote" to identify an adder that has erred.

Each of the above-mentioned techniques has two main disadvantages. Firstly, it is expensive to duplicate (and even more so to triplicate) the same adder logic. Secondly, the parity bit cannot be preserved throughout the operation of the adder system. This is undesirable when all other areas of the same system have parity bits carried throughout.

A better approach would be to construct parity predicting logic to predict the correct parity for the output of the adder. The predicted parity could then be compared against the generated parity (which is the parity based on the adder output information bits) for checking the correctness of the operation of the adder. This approach has been implemented in some sophisticated large-scale computer systems, but all previous designs have required complicated and expensive combinational logic which is in particular not suitable for small computer systems. In addition, the complexity of the previous designs for parity prediction logic has generally increased the overall machine hardware failure rate. This has led to a recognition of a need for simple and inexpensive means of implementing the parity predicting and checking logic. The means should use very few logic elements and provide improved error isolation for a high-speed carry look-ahead binary adder.

OBJECTS OF THE INVENTION

It is a primary object of the present invention therefore to provide an improved parity predicting and checking method and apparatus for a carry look-ahead binary adder.

It is a further object of the invention to provide a relatively inexpensive parity predicting and checking apparatus which contains a relatively small number of logic elements.

It is another object of this invention to provide a parity predicting method and apparatus which is utilizable with a variety of four-bit adder chip logic designs.

It is yet another object of the present invention to provide a modular approach for implementing the carry look-ahead adder such that all output signals within the adder are checked for logical faults.

Other objects and advantages of the invention will become apparent from the following descriptions of the preferred embodiment of the invention when read in conjunction with the attached drawings contained herewith.

SUMMARY OF THE INVENTION

The invention comprises logical units modularly interconnected for parity predicting and checking of operations performed by a carry look-ahead binary adder for two operands. Parity for prediction and checking is performed on two levels: first at the half-sum level and then on the full-sum level. At each level, parity is first predicted. The predicted parity is then used in checking the parity of the generated sum. Additionally, digit look-ahead carries are checked against generated look-ahead carries. The three-step checking process assures high level of confidence in error detection.

DESCRIPTION OF THE PREFERRED EMBODIMENT

1. Carry Look-Ahead Adder

In order to establish a terminology and to aid in understanding the parity predicting and checking logic for a carry look-ahead binary adder and the logic partitioning design for error isolation, this section presents a brief summary of the carry look-ahead adder logic.

The carry look-ahead adder described is a 32-bit binary adder. Its input operands are denoted as A ($A = a_0, a_1, a_2, \ldots a_{31}$) and B ($B = b_0, b_1, b_2, \ldots b_{31}$) and are stored in appropriate 32-bit registers. Each operand consists of the 32 information bits which are divided into four 8-bit groups. Each of these 8-bit groups is called a byte and has a parity bit associated with it. Odd parity is assumed throughout the whole system.

The basic adder consists of eight standard off-the-shelf four-bit adder chips (such as an Ser. No. 74181 manufactured by Texas Instruments, Inc.) and carry look-ahead logic built from standard logic gates. Although the adder chips have many different functional capabilities, in the preferred embodiment, they are used only for Addition (ADD), Subtraction (SUB), Logical AND (AND), Logical OR (OR), and Logical Exclusive OR (EXOR) operations. The principle of the carry look-ahead adder is to examine four consecutive bits (called a digit) of each of the operand inputs to the adder and to simultaneously produce the proper digit look-ahead carry for those bits. The digit look-ahead carries are applied with the digits to the four-bit adder chip which then produces proper sum bits.

Figure 1:
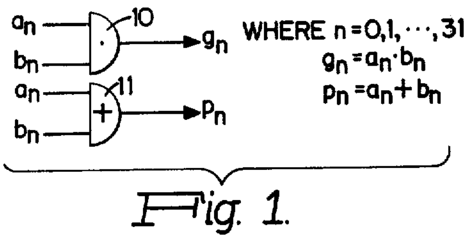
FIG. 1 is a logic diagram for producing the bit level carry generates and carry propagates.

Referring now to FIG. 1, logic for the straightforward production of the bit-level carry generates, $g_n$, and the bit-level carry propagates, $p_n$, is shown. The $n^{th}$ bits of the A and B operands, $a_n$ and $b_n$ respectively, are applied as inputs to an AND gate 10. The output of the AND gate 10 is the $n^{th}$ bit-level carry generate, $g_n$. Similarly, $a_n$ and $b_n$ are applied as inputs to an OR gate 11. The resulting output of the OR gate 11 is the $n^{th}$ bit-level propagate, $p_n$.

Figure 2:
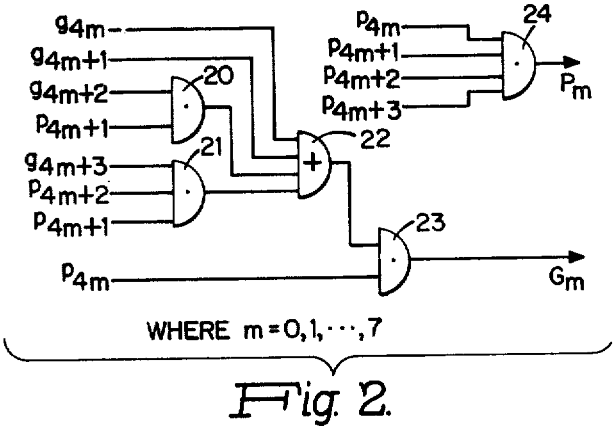
FIG. 2 is a logic diagram for producing the digit level carry generates and carry propagates.

The bit-level carry generates and carry propagates are applied to the digit level in order to produce the digit-level carry generates, $G_m$, and digit carry propagates, $P_m$. Referring now to FIG. 2, each of the eight digit-level carry generates, $G_0$ to $G_7$, are produced by applying the bit-level carry generates and carry propagates of the corresponding digit to the logic gates 20 to 23 as shown. In general, $G_m = (g_{4m} + g_{4m+1} + g_{4m+2} \cdot \cdot p_{4m+1} + g_{4m+3} \cdot p_{4m+2} \cdot p_{4m+1})\, p4m$. Similarly, each of the digit-level carry propagates, $P_0$ to $P_7$, are produced by inputting four consecutive bit-level carry propagates, $P_{4m}$ to $p_{4m+3}$, to an AND gate 24. In general $P_m = p_{4m} \cdot p_{4m+1} \cdot p_{4m+2} \cdot p_{4m+3}$.

In the same fashion, the digit-level carry propagates, $P_m$, and digit-level carry generates, $G_m$, are used to produce digit look-ahead carry outputs, $C_0$ to $C_7$, FIGS. **3*a* and 3*b*** show logical implementations for the following general equations:

$$C_0 = (G_0 + G_1 + G_2P_1 + G_3P_2P_1)P_0 + P_3P_2P_1P_0C_4$$
$$C_1 = (G_1 + G_2 + G_3P_2)P_1 + P_3P_2P_1C_4$$
$$C_2 = G_2 + G_3P_2 + P_3P_2C_4$$
$$C_3 = G_3 + P_3C_4$$
$$C_4 = (G_4 + G_5 + G_6P_5 + G_7P_6P_5)P_4 + P_7P_6P_5P_4C_{IN}$$
$$C_5 = (G_5 + G_6 + G_7P_6)P_5 + P_7P_6P_5C_{IN}$$
$$C_6 = G_6 + G_7P_6 + P_7P_6C_{IN}$$
$$C_7 = G_7 + P_7C_{IN}$$

Figure 3A:
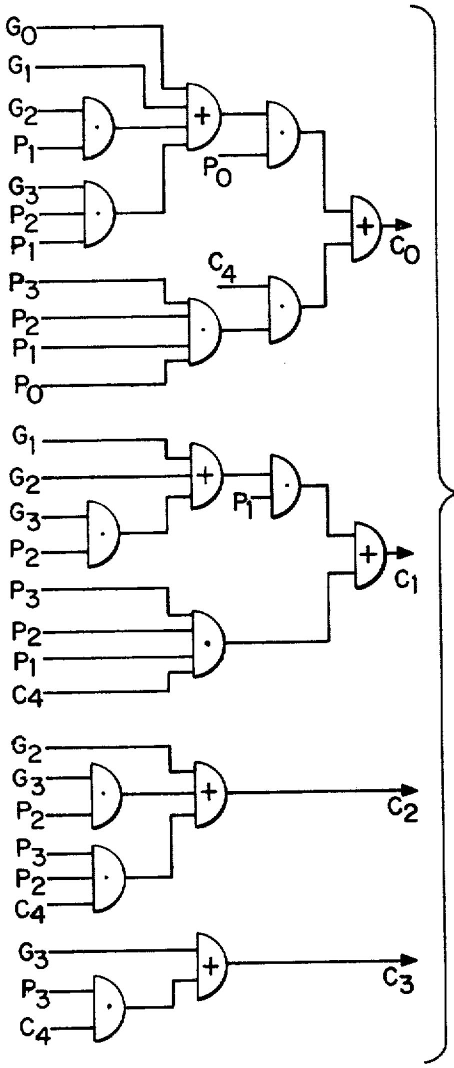
FIGS. 3*a* and 3*b* is a logic diagram for producing the digit look-ahead carries.
Figure 3B:
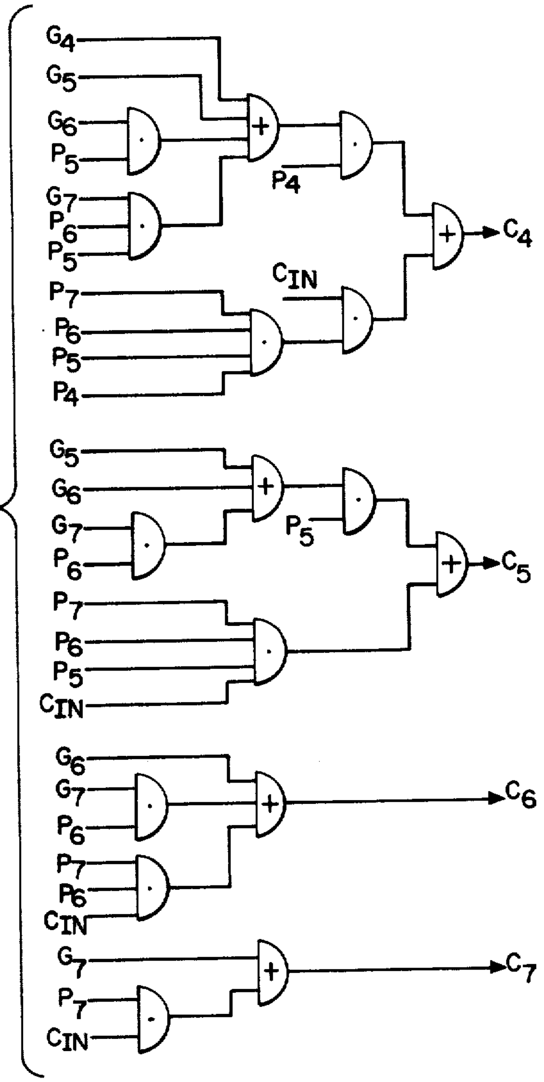
Figures 4, 5, 6, 7, 9:
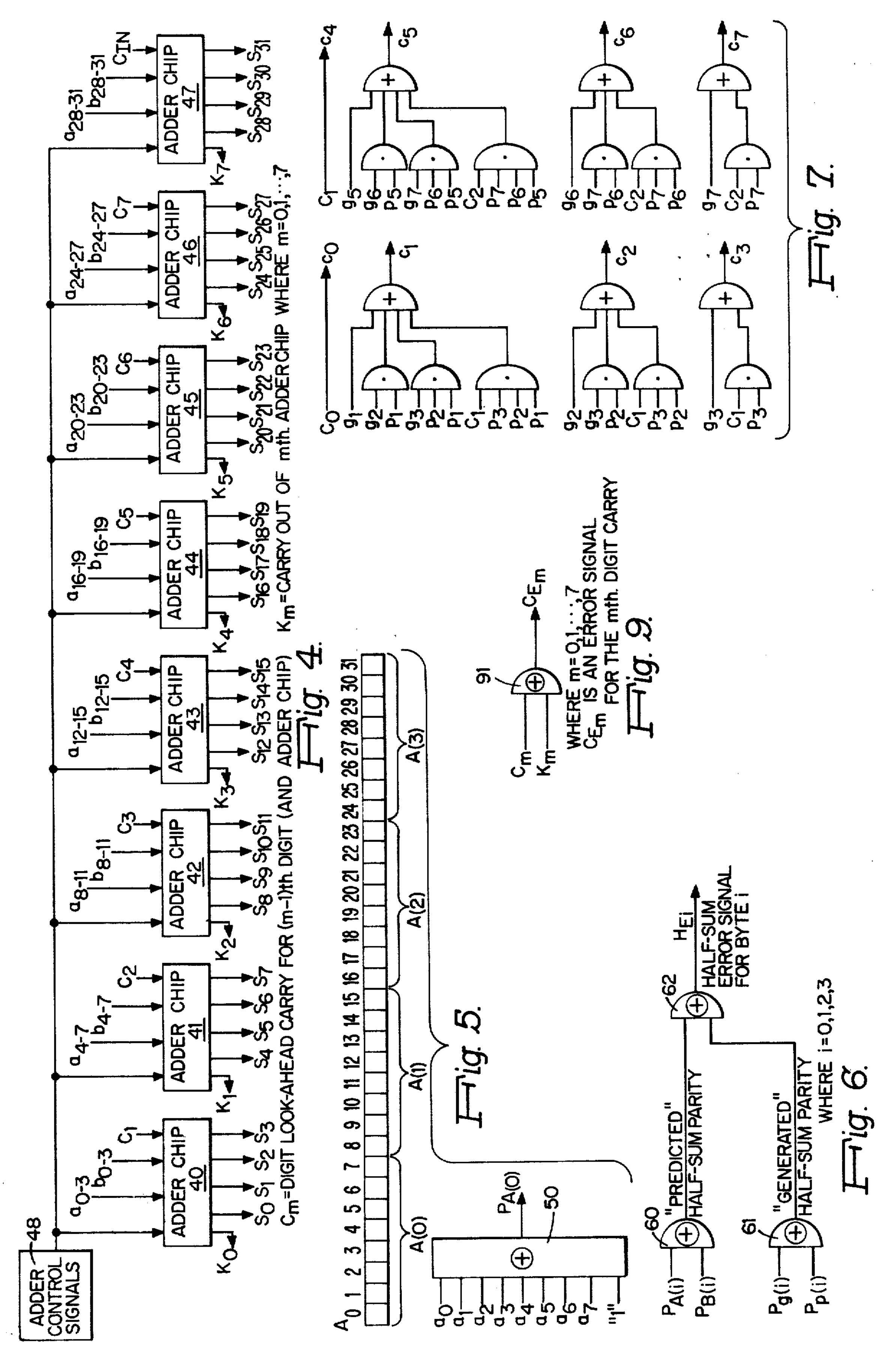
FIG. 4 is a diagram of the interconnections to the adder chips used in the adder.
FIG. 5 is a diagram of a 32 bit A operand segmented into four bytes and the odd parity associated with byte 0.
FIG. 6 is a logic diagram for performing a half-sum check.
FIG. 7 is a logic diagram for producing bit look-ahead carries of byte 0.
FIG. 9 is a logic diagram for digit carry comparison.

Referring now to FIG. 4, each of the four-bit adder chips 40 to 47 requires a digit look-ahead carry $C_1$ to $C_{IN}$ respectively, as one input for producing full sums $S_0$ to $S_{31}$. The logic shown in FIGS. 1 to 3 combine to produce the digit look-ahead carries $C_1$ to $C_7$. $C_{IN}$ is the equivalent of a digit look-ahead carry for the least significant digit and is a function of the mode of operation and is determined by means other than look-ahead logic. Note that for a 32-bit adder, eight chips 50 to 57 are needed. Each of these adder chips is controlled by the same adder control signal unit 58. Each of the adder chips, 50 to 57, receives four information bits from each of the registers containing the A and B operands and also a digit look-ahead carry. Depending on the adder control signals, the adder will perform ADD, SUB, AND, OR or EXOR operations on the A and B operands. Each of the $K_m$ is the carry produced by the $m^{th}$ adder chip.

2. Parity Predicting and Checking Logic a. Half-Sum Check

Half-sum checking logic constitutes a part of the overall adder checking logic. Refer now to FIG. 5. As previously stated, for each byte of information there is a parity bit. Therefore, for the A operand, which is 32 bits wide, there are four parity bits $P_{A(0)}$, $P_{A(1)}$, $P_{A(2)}$, $P_{A(3)}$. Each of these parity bits is assigned to one byte of information bits as follows: $P_{A(0)}$ is assigned to bits 0 through 7; $P_{A(1)}$ is assigned to bits 8 through 15; $P_{A(2)}$ is assigned to bits 16 through 23; and $P_{A(3)}$ is assigned to bits 24 through 31. The same assignment scheme applies to the B operand, so that there are four parity bits $P_{B(0)}$, $P_{B(1)}$, $P_{B(2)}$, $P_{B(3)}$. Since the checking logic is identical for every byte, only the logic configuration 50 for byte 0 of the A operand is shown in FIG. 5. In general, odd parity for byte $i$ of an operand X is defined as follows: $P_{X(i)} = x_0 \oplus x_1 \oplus x_2 \oplus x_3 \oplus x_4 \oplus x_5 \oplus x_6 \oplus x_7 \oplus 1$.

The half-sum of two operands is, by definition, the EXOR function. Therefore, the half-sum, $h_n$, of operand bits $a_n$ and $b_n$ is the exclusive OR function of $a_n$ and $b_n$: $h_n = a_n \oplus b_n$ and the half-sum predicted parity for byte $i$ is the inversion of ($P_{A(i)} \oplus P_{B(i)}$) where $P_{A(i)}$ and $P_{B(i)}$ are the parities for bytes $A_i$ and $B_i$ respectively. Using these equations and the definitional equations for the bit level carry generate, bit level carry propagate and byte parity, the following relationships may be derived:

$a_n \oplus b_n = g_n \oplus p_n$ $P_{A(i)} \oplus P_{B(i)} = P_{g(i)} \oplus P_{p(i)}$ where $P_{g(i)}$ and $P_{p(i)}$ are, respectively, parities for the bit-level carry generates and bit-level carry propagates of byte $i$.

$(P_{g(i)} \oplus P_{p(i)})$ is the inversion of the generated half-sum parity of byte ($i$) and $(P_{A(i)} \oplus P_{B(i)})$ is the inversion of the predicted half-sum parity of byte ($i$). These parities must be the same if no logic error occurs during the adder operation (or in parity predicting logic). Therefore, a check can be performed by comparing the predicted parity $(P_{A(i)} \oplus P_{B(i)})$ with the generated parity $(P_{g(i)} \oplus P_{p(i)})$. A half-sum error signal $H_{Ei}$ is generated when the predicted and generated parities of byte $i$ are unequal. FIG. 6 discloses a logic implementation for performing such a check on the $i^{th}$ byte of the operands. Identical logic is required for each of the bytes.

b. Full-Sum Check

The correct full-sum parity can be predicted by using parities of bytes of bit-level carry generates ($P_g$), parities of bytes of bit-level carry propagates ($P_p$), parities of bytes of operand A($P_A$), parities of bytes of operand B($P_B$) and parities of bit look-ahead carries ($P_c$). The predicted full-sum parity is calculated as a function of the operation mode (i.e. ADD, SUB, AND, OR, or EXOR) of the carry look-ahead adder. The predicted parity is compared with the parity of the generated full-sum and a full-sum error signal $F_{Ei}$ is generated when the predicted and generated parities of byte $i$ are unequal. The logic for these modes are discussed in the following paragraphs.

1. ADD/SUB MODE

The predicted full-sum parities for ADD (Addition) and SUB (Subtraction) are the same in this embodiment since subtraction is assumed to be done by two's complement arithmetic (i.e. by inverting the B operand and forcing the initial carry to equal one, $C_{IN} = 1$). The full sum can be represented for ADD by $[S_n]_{ADD} = a_n \oplus b_n \oplus c_{n+1}$ and for SUB by $[S_n]_{SUB} = a_n \oplus b_n \oplus c_{n+1}$ where $c_{n+1}$ is the carry from the previous bit (i.e. from the bit in the adjacent lower order position). In either mode, the predicted full-sum parity for byte $i$, $[P_{S(i)}]_{ADD/SUM}$ exhibits the following relationship:

$$[P_{S(i)}]_{ADD/SUM} = P_{A(i)} \oplus P_{B(i)} \oplus P_{c(i)}$$

where $$P_{c(i)} = c_{8i+1} \oplus c_{8i+2} \oplus c_{8i+3} \oplus c_{8i+4} \oplus c_{8i+5} \oplus c_{8i+6} \oplus c_{8i+7} \oplus c_{8i+8} \oplus 1$$

is the parity of byte $i$ of the bit look-ahead carries and where $c_{32} = C_{IN}$.

The bit look-ahead carries $c_n$ are produced by using the bit-level carry generates and carry propagates described in FIG. 1 and digit look-ahead carry outputs described in FIGS. 3a and 3b. It is easily shown that the digit look-ahead carry is the same as the most significant bit look-ahead carry of a digit group. Therefore, it is only necessary to produce the three remaining bit carries in a digit group. The equations for bit look-ahead carries of byte 0 are as follows:

$c_0 = C_0$ $c_1 = g_1 + g_1p_1 + g_3p_2p_1 + C_1p_3p_2p_1$ $c_2 = g_2 + g_3p_2 + C_1p_3p_2$ $c_3 = g_3 + C_1p_3$ $c_4 = C_1$ $c_5 = g_5 + g_6p_5 + g_7p_6p_5 + C_2p_7p_6p_5$ $c_6 = g_6 + g_7p_6 + C_2p_7p_6$ $c_7 = g_7 + C_2p_7$

The logic for producing the bit look-ahead carries of byte 0 is shown in FIG. 7. Although FIG. 7 only describes the logic for bit look-ahead carries $c_0$ through $c_7$, the rest of the bit look-ahead carries, $c_8$ through $c_{31}$, are actually implemented in the same fashion using their corresponding values for $g_n$, $p_n$ and $C_m$. Note that since the bit look-ahead carries $c_n$ are each used for addition of the next pair of operand bits, $a_{n-1}$, $b_{n-1}$, a byte of bit look-ahead carries for determining parity includes corresponding bit look-ahead carries (e.g. $P_{c(0)}$ is a function of $c_1$ to $c_8$, $P_{c(1)}$ of $c_9$ to $c_{16}$, $P_{c(2)}$ of $C_{17}$ to $c_{24}$, and $P_{c(3)}$ of $c_{25}$ to $c_{32}$ where $c_{32} = C_{IN}$). Note also that $C_{IN}$ is the same as $c_{32}$ which is the initial carry or the carry into the least significant (or last) bit position, bit 31.

2. AND MODE

Logical AND of operand bits $a_n$ and $b_n$ is represented as $S_n = a_n \cdot b_n$. The full-sum predicted parity for byte $i$, $P_{S(i)}$, can be shown to have the following relationship:

$$[P_{S(i)}]_{AND} = P_{g(i)}$$

3. OR MODE

Logical OR of operand bits $a_n$ and $b_n$ is represented as $S_n = a_n + b_n$. The full-sum predicted parity for byte $i$, $P_{S(i)}$, can be shown to have the following relationship:

$$[P_{S(i)}]OR = P_{p(i)}$$

4. EXOR MODE

Logical "exclusive OR," EXOR, of operand bits $a_n$ and $b_n$ is represented as $S_n = a_n \oplus b_n$. The full-sum predicted parity for byte $i$, $P_{S(i)}$, can be shown to have the following relationship:

$$[P_{S(i)}]_{EXOR} = \overline{P_{A(i)} \oplus P_{B(i)}}$$

Figure 8:
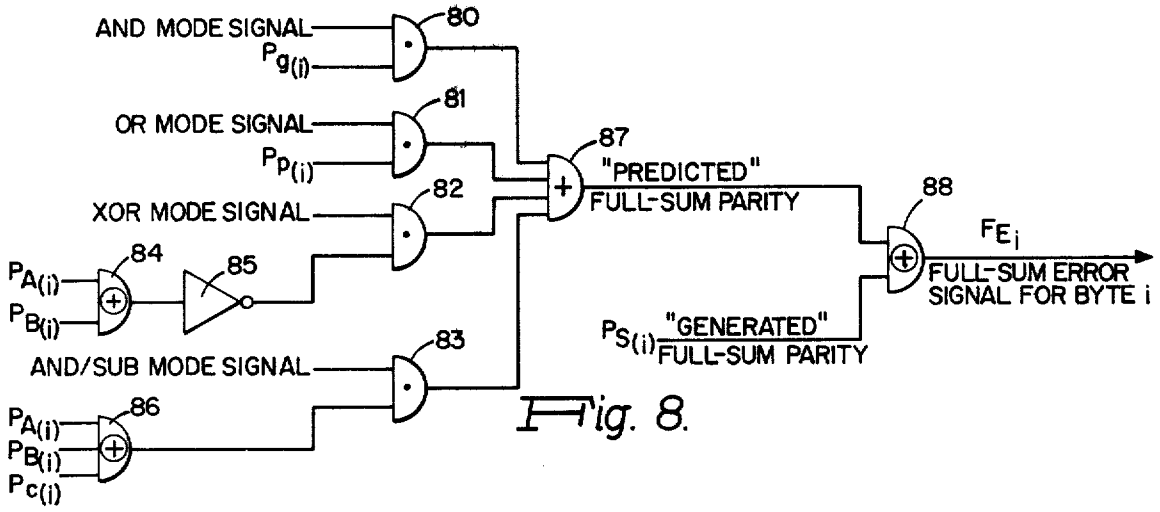
FIG. 8 is a logic diagram for full-sum checking.

The logic for full-sum checking of byte $i$ is shown in FIG. 8. (Identical logic is used for all of the bytes). An appropriate predicted full-sum parity is selected according to the mode of operation. The predicted parity for each mode of operation and the appropriate mode signal which is decoded from the adder control signals are both sent to input terminals of AND gates 80 to 83 for each mode of operation. The output signals of four AND gates 80 to 83 are sent to an OR gate 87 which produces the predicted full-sum parity. This predicted full-sum parity is compared with the generated full-sum parity $P_{S(i)}$ by sending these two full-sum parity signals to an EXOR gate 88. Any errors occurring in any logical group are thereby detected and appear as the output of EXOR gate 88 as a full-sum error signal $F_{Ei}$ for the $i^{th}$ byte.

c. Digit Carry Comparison

The digit look-ahead carries $C_0$ to $C_7$ are produced independently of the carries $K_0$ to $K_7$ produced by the four-bit adder chips by logic gates (see FIGS. 3a and 3b). However, both sets of carries should have the same values, and therefore, a comparison can be made on these two groups of carries to check for errors. EXOR gate 91 will detect differences between $C_m$ and $K_m$ (which means an error has occurred in either the adder chips or the look-ahead logic) and will result in an error signal $C_{Em}$ (which isolates the error to the $m^{th}$ digit) appearing as an output signal from EXOR gate 91. Logic for the digit carry comparison of the $m^{th}$ digit is shown in FIG. 9 and is the same for each of the $m$ digits.

d. Error Resolution

Figure 11:
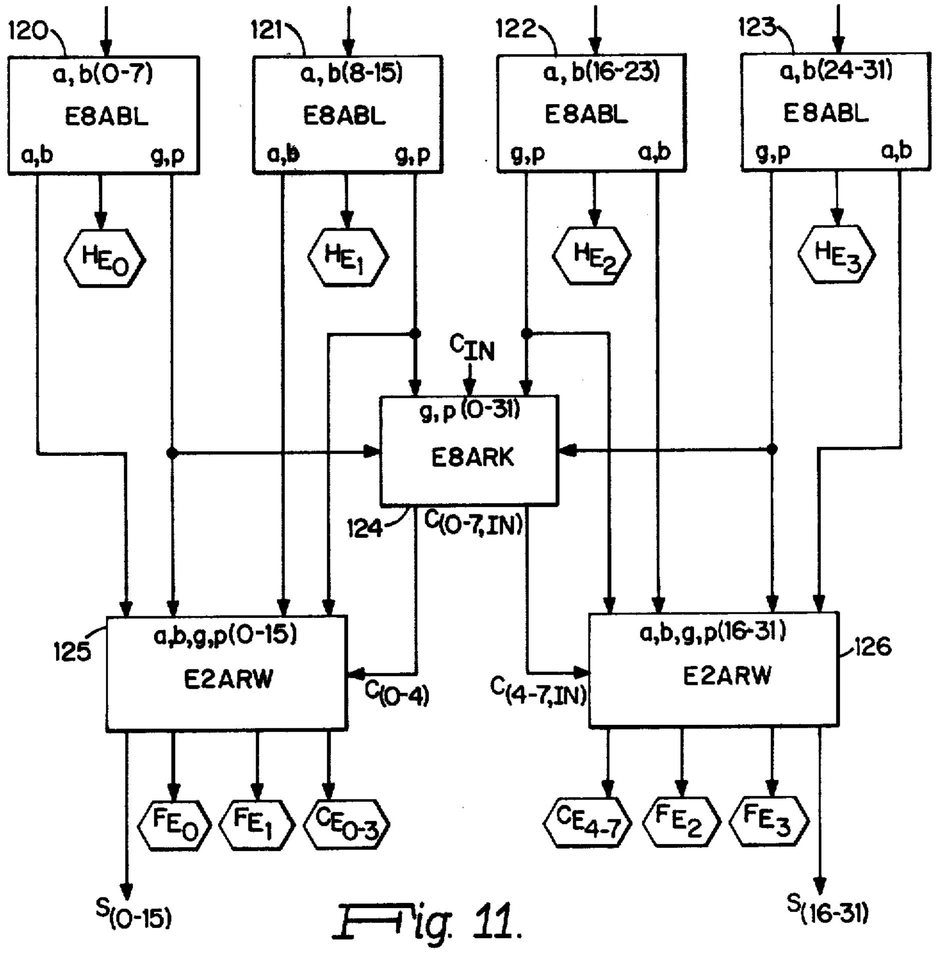
FIG. 11 is a diagram of the logic partitioning of the invention.
Figure 10:
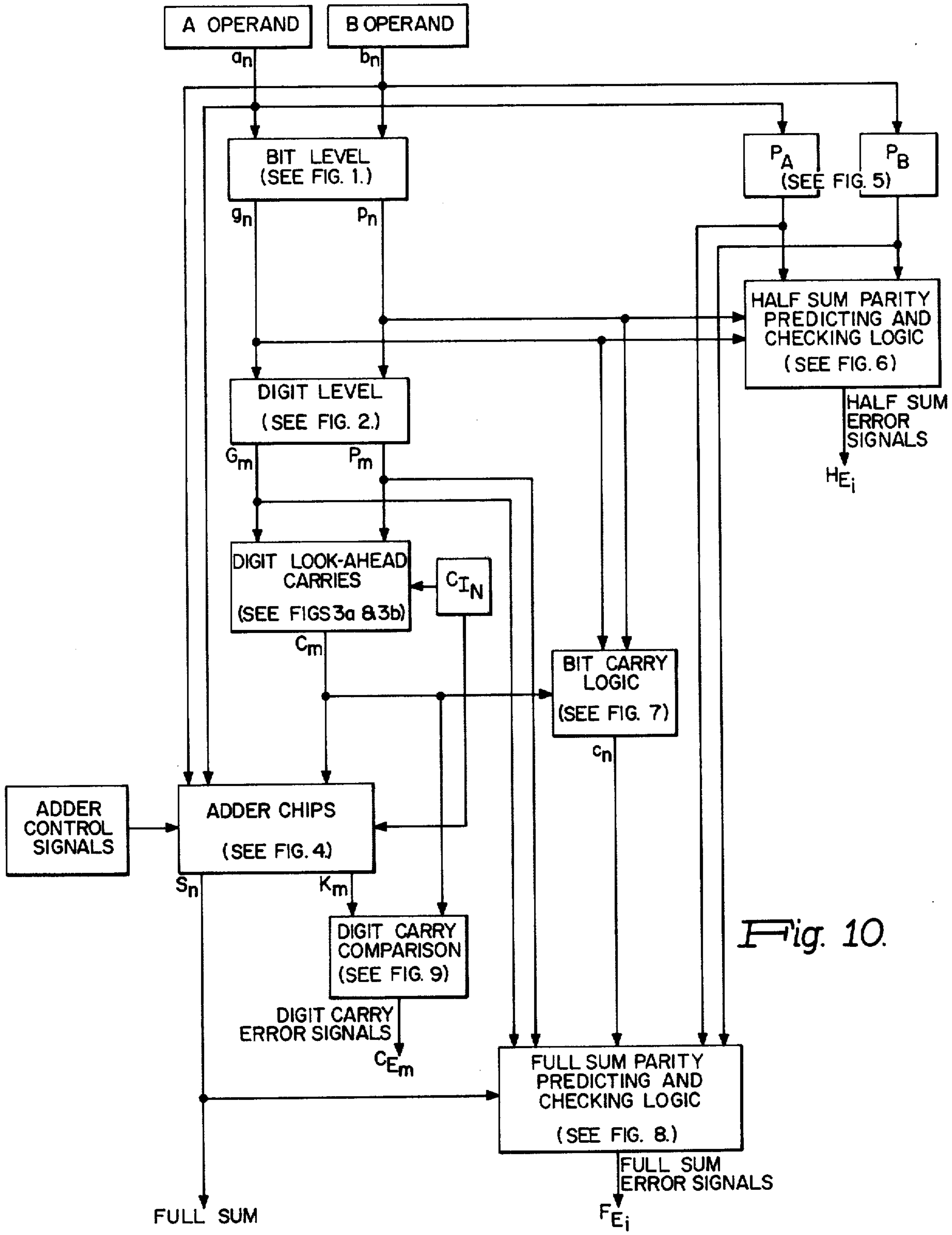
FIG. 10 is a diagram of the combined structure of a carry look-ahead adder with the parity predicting and checking logic.

It is desirable to partition the logic previously described for implementing the carry look-ahead logic and the parity predicting and checking logic so as to allow for error isolation. FIG. 10 shows the structure of the carry look-ahead adder with the parity predicting and checking logic of the invention. FIG. 11 shows a logic partitioning design for all of the logic described in this invention.

Referring now to FIG. 11, there are only three types of logic boards (E8ABL, E8ARK, and E2ARW) used in the partitioning design. Four logic boards, 120, 121, 122, 123, of the type E8ABL are used. Each of them comprises a one byte data path for 8 bits of the A operand with parity $P_A$ and eight bits of the B operand with parity $P_B$. All of the logic described in FIGS. 1, 5 and 6 are contained in these four logic boards, 120, 121, 122, 123. One logic board 124 of the type E8ARK contains the logic for all digit carry generates ($G_m$), digit carry propagates ($P_m$) and digit look-ahead carries $C_m$. (These logical units are described in FIGS. 2, 3*a* and 3*b*. Two logic boards 125, 126 of the type E2ARW are used. Each of them comprises data paths for two bytes of data. (These logical units are described in FIGS. 4, 7, 8 and 9).

The half-sum parity checking logic detect all single errors occurring in logic boards 120, 121, 122, 123. These checks ensure that all the data going out of these boards, 120, 121, 122, 123 are error free.

The digit carry comparison, which is used only for ADD/SUB operations, compares the digit look-ahead carry against the generated digit carry. A failure detected by this comparison may be caused by errors in the generation of the carries (by the adder chips) or the generation of the look-ahead carries. Consequently, this comparison logic will detect errors that may occur in either the E8ARK logic board 124 or the E2ARW logic boards 125, 126. Similarly, the full-sum check is used to cover any single error occurring in the look-ahead logic board 124 and logic boards 125, 126 containing the adder chips.

In conclusion, half-sum error checking will isolate faults to a single logic board. Digit carry comparison error and full-sum error checking will isolate an error down to one or two boards depending on the mode of operations. For ADD/SUB mode, the error isolation is to two boards wide, but for AND, OR, EXOR, the error isolation is to just one board. Using this design scheme, an error can be detected and isolated effectively.

The error detection logic are issued as shown in FIG. 11. There is a half-sum check signal within each of the four logic boards, 120, 121, 122, 123. Any errors occurring in the transmission from the A or the B operand registers to the boards or within the boards are isolated to a board. There are eight digit carry comparison tests performed (one for each digit). Thus, if any faults occur in the logic boards 124, 125, 126, the error signals can point to the logic for a particular digit where the error is actually taking place. There are four full-sum checks. Each of these is performed on one byte of adder outputs. Any error occurring in full-sum may be isolated to within one or two board area.

As shown in FIG. 11, each of the outputs from all of the logic boards is checked to ensure that the logic in each board is functioning properly. The partitioning arrangement is excellent for fault diagnosis and maintenance purposes. Also, using the same logic board type, E8ABL, for all four bytes has the advantage that when an error does occur, a simple procedure of interchanging boards will detect and isolate the error. The same is also true for the logic boards of the type E2ARW. Only three types of boards are used for this implementation, thereby keeping the cost minimal.

What is claimed is:

1. In combination with a carry look-ahead binary adder for a first and a second operand, said adder responsive to control signals for performing one of a plurality of logical operations and providing a corresponding set of result signals and including adder chips and a half-sum adder with look-ahead logic, an improved system for error detection comprising:

first logical means responsive to said first and said second operands for predicting parities for each byte of half-sums of said operands;

second logical means coupled to output terminals of said first means and to output terminals of said half-sum adder for comparing said predicted half-sum parities to parities of each byte of generated half-sums of said operands and for producing half-sum error signals corresponding to each byte when said predicted and said generated half-sum parities are unequal;

third logical means responsive to said control signals and coupled to said look-ahead logic for predicting parities for each byte of said result signals for said operands;

fourth logical means coupled to output terminals of said third means and to output terminals of said adder chips for comparing said predicted result signal parities to parities of each byte of generated result signals for said operands and for producing result error signals corresponding to each byte when said predicted and said generated result signal parities are unequal; and fifth logical means coupled to said look-ahead logic and to output terminals of said adder chips for comparing carries generated by said look-ahead logic to output carries generated by said adder chips and for producing carry error signals when said carries are unequal.

2. A system as recited in claim 1 wherein said look-ahead logic produces digit level look-ahead carries and said fifth means compares digit level look-ahead carries to digit output carries and produces digit error signals.

3. A system as recited in claim 1 wherein said first and said second means are grouped together to form half-sum logical units and said half-sum error signals detect and isolate errors within said half-sum units.

4. A system as recited in claim 1 wherein said third means, said fourth means, said adder chips and said look-ahead logic are grouped together to form full-sum logical units and said result error signals detect and isolate errors within said full-sum units.

5. A system for detecting an isolating error in a carry look-ahead binary adder for a first and a second operand, said adder responsive to control signals for performing one of a plurality of logical functions, said system comprising:

first logical means responsive to said first and said second operands for generating predicted parities for each byte of half-sums of said operands;

second logical means responsive to said first and said second operands for generating half-sums of said operands and generated parities of said half-sums;

third logical means coupled to said first and said second means for comparing said predicted parities to said generated parities and for producing half-sum error signals corresponding to each byte when said predicted and said generated parities are unequal;

fourth logical means responsive to said first and said second operands for generating look-ahead carries for said adder;

fifth logical means responsive to said control signals and coupled to said first and said second operands and to said fourth means for generating results of said one logical operation on said operands and full-sum carries of said operands;

sixth logical means coupled to said fourth and to said fifth means for comparing said look-ahead carries to said full-sum carries and for producing carry error signals when said carries are unequal;

seventh logical means responsive to said control signals and coupled to said fourth means for generating predicted parities for each byte of said results of said operands; and eighth logical means coupled to said fifth and to said seventh means for comparing said predicted parities to parities of said results and for producing full-sum error signals corresponding to each byte when said predicted and said generated parities are unequal.

6. A system as recited in claim 5 wherein said fourth logical means comprises:

ninth logical means responsive to said first and said second operands for generating carry propagates and carry generates; and tenth logical means coupled to said ninth means for generating look-ahead carries for said adder.

7. A system as recited in claim 6 wherein said sixth means operates on said look-ahead and said full-sum carries on a digit level and produces digit carry error signals.

8. Improved method of detecting and isolating errors within a carry look-ahead binary adder including look-ahead logic and adder chips and responsive to control signals for performing one of a plurality of logical operations for a first and a second operand comprising the steps of:

generating half-sums of said operands and parities for each byte of said generated half-sums;

predicting parities of each byte of half-sums of said operands;

comparing said generating half-sum parities to said predicted half-sum parities and producing half-sum error signals corresponding to each byte whenever said half-sum parities are unequal;

generating parities for each byte of results of said one logical operation on said operands;

predicting parities of each byte of results of said one logical operation on said operands;

comparing said generated result parities to said predicted result parities and producing result error signals corresponding to each byte whenever said result parities are unequal; and comparing look-ahead carries generated by said look-ahead logic to output carries generated by said adder chips and producing carry error signals when said carries are unequal.

9. A method as recited in claim 8 comprising the further step of grouping means for generating half-sums with means for predicting and comparing half-sum parities to form logical units for which said half-sum error signals indicate the detection of errors therein.

10. A method as recited in claim 8 comprising the further step of grouping said adder chips and said look-ahead logic with means for predicting and comparing result parities to form logical units for which said result error signals indicate the detection of errors therein.

* * * * *